Jan. 2, 1923. 1,440,550.
B. G. PATTERSON.
NUT LOCK.
FILED DEC. 28, 1920.
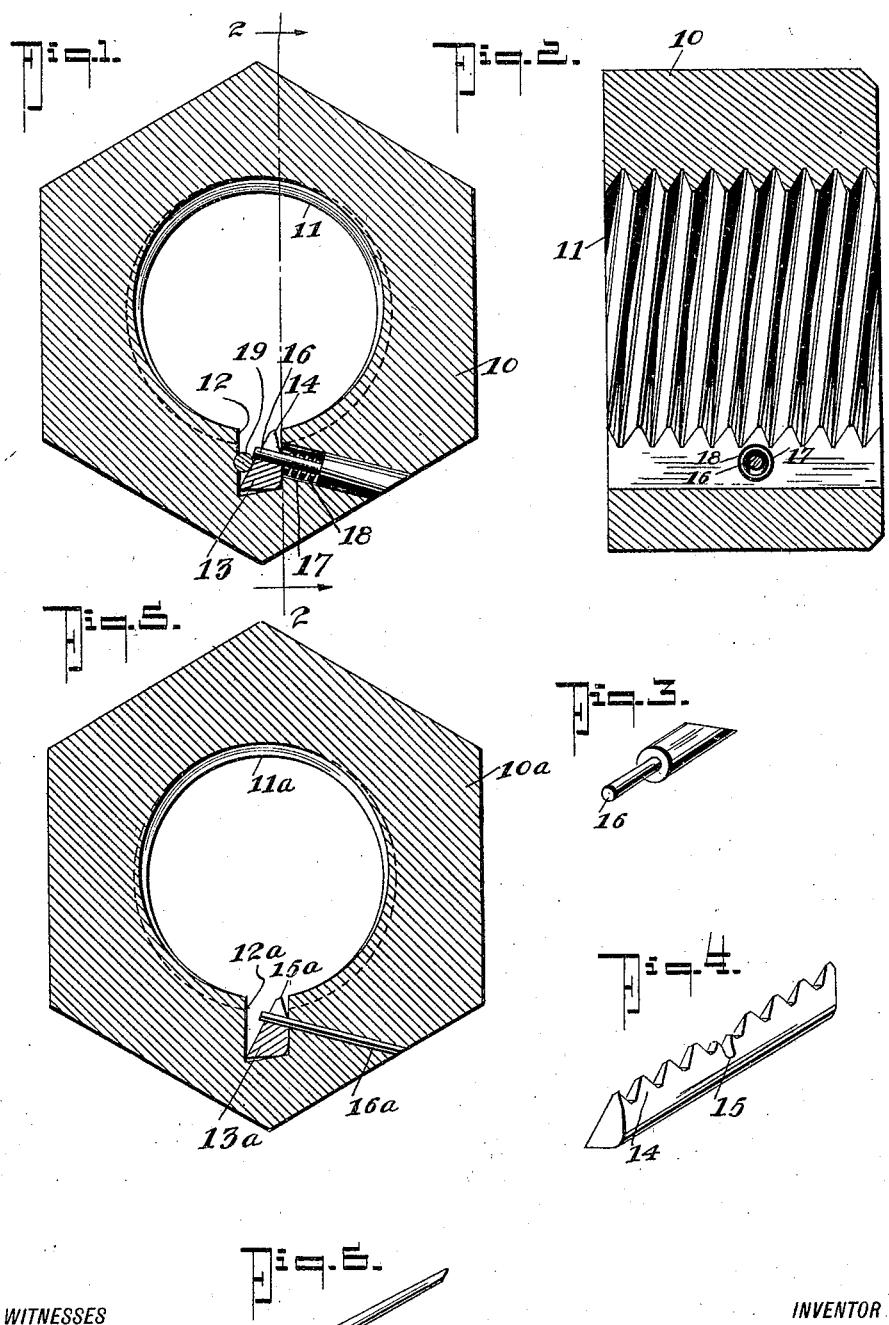
WITNESSES
Geo. V. Hall.
INVENTOR
B. G. Patterson.
BY
ATTORNEYS Patented Jan. 2, 1923.

1,440,550

UNITED STATES PATENT OFFICE.

BENJAMIN G. PATTERSON, OF OKLAHOMA, OKLAHOMA.

NUT LOCK.

Application filed December 28, 1920. Serial No. 433,626.

*To all whom it may concern:*

Be it known that I, BENJAMIN G. PATTERSON, a citizen of the United States, and a resident of Oklahoma city, in the county of Oklahoma and State of Oklahoma, have invented certain new and useful Improvements in Nut Locks, of which the following is a specification.

My present invention relates generally to nut locks, and more particularly to a nut lock of that type in which the nut itself is provided with internal means to lockingly engage the threads of a bolt in case of any tendency toward rotating movement of the nut off of the bolt.

More especially my invention relates to that type of device shown in my Patent No. 1,042,962 dated October 29, 1912 and aims to provide a simple and effective means for holding a locking dog in the nut slot against accidental displacement while the nut is being screwed onto the bolt.

The invention as proposed is susceptible of two forms depending upon whether the nut is permanently placed in the first instance or is to be subject to frequent removal for purposes of adjustment, and both of these forms will be now described in connection with the accompanying drawing, which forms a part of this specification, and in which, Figure 1 is a transverse section through a nut provided with my improvements and adapted for frequent removal and adjustment, Figure 2 is a longitudinal section therethrough taken on line 2—2 of Figure 1, Figure 3 is a detail perspective view of the dog holding pin, Figure 4 is a detail perspective view of the locking dog removed, Figure 5 is a transverse section through a modified form in the nature of a permanently placed nut, and Figure 6 is a detail perspective view of the dog holding pin of Figure 5.

Referring now to these figures I have shown in Figures 1 and 2 a nut 10 having the usual threaded bore 11 and provided in the wall of its said bore with a lengthwise groove 12, the latter receiving in movable relation a locking dog 13 having an innermost toothed lengthwise edge 14, the teeth being formed to coincide with the threads of the bore 11 and the locking dog being so formed and disposed within the slot as to permit of ready movement of the nut on to a bolt and to rock within the slot 12 and into locking engagement with the bolt thread upon any tendency of the nut to turn in the opposite direction.

This locking dog 13 has one inclined face normally spaced from one side wall of the slot 12 and is also provided with a transverse groove 15 in its toothed edge, intermediate its ends, through which the inner end of a dog holding pin 16 is extended so as to hold the locking dog within the nut and against accidental displacement, particularly while the nut is being screwed on to the bolt, it being obvious that this pin forms no impediment to effective movement of the locking dog into engagement with the bolt threads.

The pin 16 is shown in Figures 1 and 3 as having an inner reduced portion, its outer portion or body being fixed within a bore 17 extending from the slot 12 through one of the polygonal faces of the nut, approximately upon a tangent to the bore 11 of the nut, so as to adapt the inner portion of this bore to the reception of a spring 18, surrounding the inner reduced portion of the pin and bearing between the pin shoulder and the locking dog 13 so as to tend to force the latter toward and into engagement with the bolt threads at all times.

In this way the locking dog may be made slightly smaller than the slot in order that the nuts may be freely turned on to the bolt, and just as freely turned off of the bolt by the use of an unlocking pin 19 which may be forced lengthwise into the slot 12 between one side wall which may have a recess for the pin, and the inclined side face of the locking dog as seen in Figure 1.

This structure is of particular use in connection with nuts where there is frequent occasion to adjust the parts held thereby, requiring the nut to be either loosened or removed, but the invention may be carried out by the use of a pin 16ᵃ as seen in Figures 5 and 6, of one diameter throughout, which is extended through a conformable opening of the nut 10ᵃ at a tangent to its threaded bore 11ᵃ, with the inner end projecting into the slot 12ᵃ and through the transverse recess 15ᵃ of the locking dog 13ᵃ. In this case the locking dog is made slightly larger than in Figures 1 to 4 inclusive so that it will engage the bolt threads at all times and the friction of this engagement will serve to rock the locking dog into locking engagement with the bolt threads upon any tendency of the nut to turn off of the bolt. This construction dispenses with a spring and is intended for use with nuts that are to be permanently applied.

According to either structure my invention serves to effectively hold the locking dogs in place after they are once inserted in the nut slots and the holding pins placed in position, and it will be noted that in either form the outer ends of the holding pins are cut off flush with the corresponding polygonal face of the nut so that there will be no danger of interference with the engagement of a wrench for the purpose of turning the nut.

I claim:

1. A nut having a threaded bore and a lengthwise slot in the wall of said bore, a locking dog mounted within the slot and mounted to rock laterally therein, said dog having a toothed inner edge and a transverse recess intermediate its ends, and means mounted in connection with the nut and extending movably into the recess for normally holding the dog against displacement, said means consisting of a pin fixed through the nut at a tangent to its threaded bore as described.

2. A nut having a threaded bore and a lengthwise slot in the wall of said bore, a toothed locking dog mounted to rock laterally within the said slot and having a recess in its toothed edge intermediate its ends, said nut having an opening extending therein from one of its polygonal faces at a tangent to its threaded bore and communicating at its inner end with the slot, a pin fixed within said opening and having its inner end extending into the recess of the locking dog and a spring supported by said pin and engaging the dog.

3. A nut having a threaded bore and a lengthwise slot in the wall of said bore, a toothed locking dog mounted to rock laterally within the said slot and having a recess in its toothed edge intermediate its ends, said nut having an opening extending therein from one of its polygonal faces at a tangent to its threaded bore and communicating at its inner end with the slot, a pin fixed within the said opening and having a reduced inner portion extending into the recess of the locking dog and forming a shoulder, and a spring around the reduced inner portion of the pin, said spring being seated against said shoulder at one end and bearing against the locking dog at its opposite end.

4. A nut having a threaded bore and a lengthwise slot in the wall of said bore, a toothed locking dog mounted to rock transversely in the bore, said dog having one side face spaced from the adjacent side face of the slot and having a recess in its toothed edge, a pin carried by the nut and extending into the recess of the dog to prevent lengthwise displacement of the latter, a spring in connection with the pin and engaging the dog to rock the same in one direction, and an unlocking pin shiftable against the locking dog between the said side face and the said wall of the slot, to rock the dog against the tension of said spring.

BENJAMIN G. PATTERSON.